US012173255B2

(12) United States Patent
Staley et al.

(10) Patent No.: US 12,173,255 B2
(45) **Date of Patent: *Dec. 24, 2024**

(54) MULTIPLE CANDLE WICK ASSEMBLIES AND METHODS AND APPARATUS FOR MAKING THE SAME

(71) Applicant: FIL-TEC HOLDINGS, INC., Cavetown, MD (US)

(72) Inventors: Kyle R. Staley, Waynesboro, PA (US); Andrew L. Wallech, Falling Waters, WV (US); Lesa F. Bowers, Hagerstown, MD (US); Charles H. Rockwell, Boonsboro, MD (US); Amir Yaraghi, Fairplay, MD (US); Vincent E. Schoeck, Jr., Hagerstown, MD (US); Vincent E. Schoeck, V, Hagerstown, MD (US)

(73) Assignee: FIL-TEC HOLDINGS, INC., Cavetown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,746

(22) Filed: Aug. 29, 2023

(65) Prior Publication Data

US 2023/0407204 A1 Dec. 21, 2023

Related U.S. Application Data

(60) Division of application No. 17/734,992, filed on May 2, 2022, now Pat. No. 11,814,602, which is a (Continued)

(51) Int. Cl.
*C11C 5/00* (2006.01)
*C11C 5/02* (2006.01)

(52) U.S. Cl.
CPC .............. *C11C 5/006* (2013.01); *C11C 5/008* (2013.01); *C11C 5/02* (2013.01)

(58) Field of Classification Search
CPC ............ C11C 5/006; C11C 5/008; C11C 5/02
See application file for complete search history.

(56) References Cited

U.S. PATENT DOCUMENTS 31,049 A * 1/1861 Wortendyke .............. F23D 3/00 431/298
2,121,293 A 6/1938 Heil
(Continued)

FOREIGN PATENT DOCUMENTS

EP 3572488 11/2019
EP 3650754 5/2020
(Continued)

OTHER PUBLICATIONS

EP Application No. 20211891, Extended European Search Report, Apr. 21, 2021.
(Continued)

*Primary Examiner* — Latosha Hines
(74) *Attorney, Agent, or Firm* — NIXON & VANDERHYE P.C.

(57) ABSTRACT

Methods of making a candle wick assembly are disclosed whereby a multiple candle wick construction is provided which includes (i) at least first and second spaced-apart candle wicks, and (ii) a ladder filament connected to and extending back and forth between the first and second candle wicks. The multiple candle wick construction is formed into a generally U-shaped configuration and a wax sheath thereafter applied around the multiple candle wick construction so as to maintain the generally U-shaped configuration thereof.

16 Claims, 7 Drawing Sheets

Related U.S. Application Data continuation of application No. 17/127,954, filed on Dec. 18, 2020, now Pat. No. 11,370,992, which is a division of application No. 16/704,488, filed on Dec. 5, 2019, now Pat. No. 10,975,329.

(56) References Cited

U.S. PATENT DOCUMENTS

| | | | | |
|---|---|---|---|---|
| 2,189,412 | A * | 2/1940 | Arnone | F21V 37/00 87/6 |
| 2,210,290 | A | 8/1940 | Heinsohn | |
| 2,818,718 | A | 1/1958 | Roberts et al. | |
| 2,829,511 | A * | 4/1958 | Oesterle | C11C 5/006 431/291 |
| 2,845,785 | A | 8/1958 | Weglin | |
| 2,912,742 | A * | 11/1959 | Choate | D04D 1/00 57/236 |
| 3,390,444 | A | 7/1968 | Bjorck | |
| 3,582,251 | A | 6/1971 | Concannon | |
| 4,291,458 | A | 9/1981 | Flinn | |
| 5,863,196 | A | 1/1999 | Rockwell | |
| 6,286,248 | B1 * | 9/2001 | Bryant | A01M 1/2066 43/125 |
| 6,699,034 | B2 * | 3/2004 | Schoeck | F23D 3/16 431/325 |
| 6,758,667 | B2 | 7/2004 | Wilson | |
| 2003/0013060 | A1 * | 1/2003 | Schoeck | C11C 5/006 431/325 |
| 2003/0211437 | A1 | 11/2003 | Wilson | |
| 2006/0292509 | A1 | 12/2006 | Reisman et al. | |
| 2013/0095440 | A1 | 4/2013 | Cagle et al. | |
| 2017/0114997 | A1 | 4/2017 | Major | |
| 2018/0355279 | A1 | 12/2018 | Staley et al. | |

FOREIGN PATENT DOCUMENTS

| | | |
|---|---|---|
| GB | 190903559 | 10/1909 |
| GB | 191126629 | 11/1912 |
| GB | 1058844 | 2/1967 |
| GB | 1514338 | 6/1978 |

OTHER PUBLICATIONS

Extended European Search Report (EESR), EP Application No. 18211566.7, May 2, 2019.

* cited by examiner

MULTIPLE CANDLE WICK ASSEMBLIES AND METHODS AND APPARATUS FOR MAKING THE SAME

CROSS-REFERENCE TO RELATED APPLICATIONS

This application is a divisional of U.S. application Ser. No. 17/734,992 filed on May 2, 2022 (now U.S. Pat. No. 11,814,602), which in turn is a continuation of U.S. application Ser. No. 17/127,954 filed on Dec. 18, 2020 (now U.S. Pat. No. 11,370,992), which in turn is a divisional of U.S. application Ser. No. 16/704,488 filed Dec. 5, 2019 (now U.S. Pat. No. 10,975,329), and is related to U.S. patent application Ser. No. 15/985,991 filed on May 22, 2018 (now U.S. Pat. No. 11,021,677), the entire contents of each being expressly incorporated hereinto by reference.

FIELD

The embodiments disclosed herein relate generally to candle wicks and methods and apparatus of making the same. More specifically, the embodiments disclosed herein relate to candle wick assemblies having multiple individual candle wicks that can be associated with a solid candle wax fuel as part of an integral wick system. When lit, the candle wick assemblies allow the multiple candle wicks to separate from one another so as to achieve a broader and shorter flame thereby in turn causing an expanded liquid wax pool to be formed on the surface of the candle.

BACKGROUND

Candles employing a wick have been in existence for many centuries. A typical candle has a single wick, or multitude of wicks, that extends longitudinally through the body of the candle. Single wicks are usually centrally disposed in the candle body. The combustible candle body is typically a thermoplastic blend of petroleum (paraffin) wax, mineral (montan) wax, synthetic wax (polyethylene or Fischer-Tropsch (FT) waxes) or natural waxes (vegetable or animal waxes). Clear candle waxes, known as gel candles, have diverse decorating potential. These gel candles are made from mineral oil and special resins. Natural, plant based soybean wax is gaining popularity as a cost competitive, environmental or "green" wax derived from renewable resources. Various additives used to modify the candle hardness, color, burn rate and aroma are well known in the trade and include, for example, stearic acid, UV inhibitors, polyethylene, scent oils and color pigments. Upon lighting a candle wick, the heat melts the wax which then travels up the wick by capillary action and is vaporized. Performance requirements of a wick in a candle include the ability to create and maintain the desired burn rate, the ability to create and maintain the desired wax pool and, if specified or required, the ability to bend or curl to maintain the proper wick height (referred to in the trade as "self-trimming"). In addition to these performance requirements, it is important that the finished wick be stable and not subject to size fluctuation when tension is applied to the wick during the candle making or wick pre-waxing process. The ability of the wick to be self-supporting may be preferred, or even required, in certain candle types or candle manufacturing processes, e.g., so-called poured candle constructions where the molten wax fuel is poured into a mold around a pre-positioned and pre-waxed wick and thereafter allowed to solidify.

One performance characteristic of scented candles that may be employed for environmental scent freshening or aroma therapy is the size and/or speed of the liquid pool of wax fuel that forms on the top of the candle. In general, manufacturers of scented candles prefer to have a large liquid pool of wax fuel as this increases the scent released into the ambient environment. At the same time, however, flame height cannot be too high or the candle flame will then emit undesirable soot that can mar the appearance of the candle and candle holder and nearby surfaces, i.e., by visible smoke being emitted from the candle flame and being deposited as soot on the candle holder and into the environment and/or by the presence of undesirable black carbon droppings that are visible in the liquid wax pool. These carbon deposits, can cause secondary ignition, a safety hazard near the end of the candle life. A single conventional wick large enough to produce the necessary heat to form the desired size liquid wax pool often results in an unreasonably high flame, carbon deposits and excess sooting all of which are undesirable and some of which are unsafe.

It is known that providing multiple spaced-apart wicks will increase the size of the liquid wax pool while maintaining several smaller flames. However, increasing the number of wicks will in turn increase manufacturing costs (and hence increase the cost of the finished candle product) since multiple wick insertions must be made into the solid wax fuel during production. Additionally, conventional multiple wick candles produce a much less consistent burn environment within the candle. Having two or more independent flames causes considerable air turbulence which changes as the wax level in the candle container drops over time. This air turbulence within the candle container can cause the flame height to fluctuate significantly from under ¼ " to over 1.5" over the life of the candle.

It would therefore be highly desirable if a candle wick could be provided as a single wick assembly having multiple individual wicks that are capable of separating one from another when lit to thereby achieve an increased liquid wax pool size which is of substantially uniform diameter with a single stable and broader flame exhibiting decreased flame height comparable to conventional multiple wick candles, yet can be produced using single wick manufacturing techniques (i.e., since the multiple wicks are separably contained within a single wick assembly). It is towards fulfilling such needs that the embodiments disclosed herein are directed.

SUMMARY

In general, the embodiments disclosed herein provide multiple candle wick assemblies that may be placed into a candle wax (e.g., paraffin) body utilizing conventional single candle wick manufacturing techniques. When lit, the multiple candle wicks as described herein will therefore provide for an increased wax pool diameter (thereby increasing the amount of liberated scents from the candle body) with lower flame height (and thereby decreased risk of sooting) at wax burn rates that are comparable to single candle wicks.

In some preferred embodiments, the multiple (e.g., two or more) candle wicks as disclosed herein will include a wick construction having at least one pair of substantially parallel elongate candle wicks which are laterally separated from one another, and a ladder filament connecting the pair of candle wicks. The ladder filament extends back and forth between the candle wicks (e.g., at substantially 90° relative to the elongate axes of the wicks) so as to establish respective crossing portions that are spaced apart from one another along a lengthwise direction of the construction.

Virtually any conventional candle wick may be employed in the embodiments disclosed herein. For example, the candle wicks may be formed of braided or knitted wick yarns of spun cotton or rayon. The candle wicks may include elongate stiffening elements along the longitudinal extent thereof so as to impart self-supporting characteristics to the candle wicks. In especially preferred forms, the wick is a knit wick structure.

According to some embodiments, candle wick assemblies are provided having a multiple (e.g., two or more) candle wick construction and a wax sheath covering the multiple candle wick construction. The multiple candle wick construction will include at least first and second spaced-apart candle wicks (e.g., braided, woven, twisted or knit wick yarns formed, for example, of spun cotton fibers, rayon fibers, hemp fibers, linen fibers, bamboo fibers and cellulosic fibers), and a ladder filament connected to and extending back and forth between the first and second candle wicks so as to establish respective crossing portions that are spaced apart from one another along a lengthwise direction of the wick assembly. The crossing portions of the ladder filament may therefore be substantially orthogonal to respective elongate axes of the first and second candle wicks. The crossing portions of the ladder filament are folded so that the candle wick assembly is in a generally U-shaped configuration. Such candle wick assemblies may therefore include crossing portions that have a generally concave central region when the candle wick assembly is in the generally U-shaped configuration such that the wax sheath includes a concavity generally corresponding to the concave central region of the crossing portions extending along the lengthwise direction of the wick assembly.

The ladder filament may be a monofilament having sufficient flexural stiffness so as to apply a resilient bias force to the first and second candle wicks in a direction to further separate the first and second candle wicks upon release of the bias force. Additionally or alternatively, the first and second candle wicks may include elongate stiffening elements, e.g., formed of thermoplastic monofilaments and/or spun yarns of natural fibers coated with a thermoplastic material, to impart self-supporting characteristics to the first and second candle wicks.

Methods and apparatus for making a wax-coated candle wick assembly having a generally U-shaped configuration as disclosed herein will preferably include providing a multiple candle wick construction having at least first and second spaced-apart candle wicks, and a ladder filament connected to and extending back and forth between the first and second candle wicks so as to establish respective crossing portions that are spaced apart from one another along a lengthwise direction of the wick construction. A wax applicator is provided having an applicator channel sized and configured to receive the multiple candle wick construction therein and an inlet forming die having an inlet orifice upstream of the applicator channel. A forming device is provided so as to assist in folding the candle wick construction about its longitudinal axis so as to assume a generally U-shaped configuration upon entering a wax applicator. According to some embodiments, the forming device is provided as an integral component of the inlet die, e.g., a die having an inlet orifice to the wax applicator channel which is sized and configured so as to assist in folding of the candle wick construction about its longitudinal axis. Alternatively or additionally, the forming device may include a forming mandrel oriented parallel to the longitudinal axis of the candle wick construction so as to assist in such folding of the candle wick construction into a generally U-shaped configuration.

The forming mandrel may be embodied in several structural forms. For example, the forming mandrel may be in the form of a wax filament which is conveyed with the candle wick construction through the wax applicator (and thereby becomes a part of the wax sheath). Alternatively the forming mandrel may be embodied by stationary curved mandrels that are oriented parallel to the elongate axis of the wick construction in a fixed position relative to or at least partially within the wax applicator channel. Thus, the forming mandrel may be in the form of a fixed forming wire positioned into at least the forming orifice of the forming die and extending a predetermined distance into the wax applicator channel and/or an elongate mandrel assembly fixed within the wax applicator channel that includes a convexly curved surface (e.g., a rod or plate having a curved edge) serving as a contact surface with the crossing portions of the ladder filaments to thereby facilitate folding of the candle wick structure about its longitudinal axis.

The candle wick construction is preferably presented to the inlet orifice of the inlet forming die in a substantially flat configuration. The introduction of the candle wick construction into the inlet orifice of the inlet forming die in relation to the forming device will thereby cause the crossing portions of the ladder filament to be folded about the longitudinal axis of the candle wick construction and thereby in turn cause the candle wick assembly to assume a generally U-shaped configuration. The candle wick construction may then subsequently be conveyed through the applicator channel so allow a wax sheath to be applied therein onto the candle wicks and crossing portions of the ladder filament and thereby maintain the candle wick construction in the U-shaped configuration thereof.

According to those embodiments whereby the forming device includes a fixed position forming wire, a proximal end of the forming wire may be positionally fixed such that a distal end of the forming wire extends through the inlet orifice of the inlet forming die and into the applicator channel. The free distal end of the forming wire will therefore terminate a predetermined distance within the applicator channel.

The wax applicator may also be provided with an outlet die having an outlet orifice through which the wax-coated U-shaped wick assembly may be conveyed. A cooling system (e.g., a liquid (water)) bath system and/or a cooling air system) may be positioned downstream of the outlet forming die so as to solidify the wax and thereby maintain the wick assembly in the U-shaped configuration thereof. One or more wax applicators (and associated inlet and outlet forming dies with inlet and outlet forming orifices) and related cooling systems may also be provided as may be needed in order to achieve the final form of the candle wick assembly.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 5:
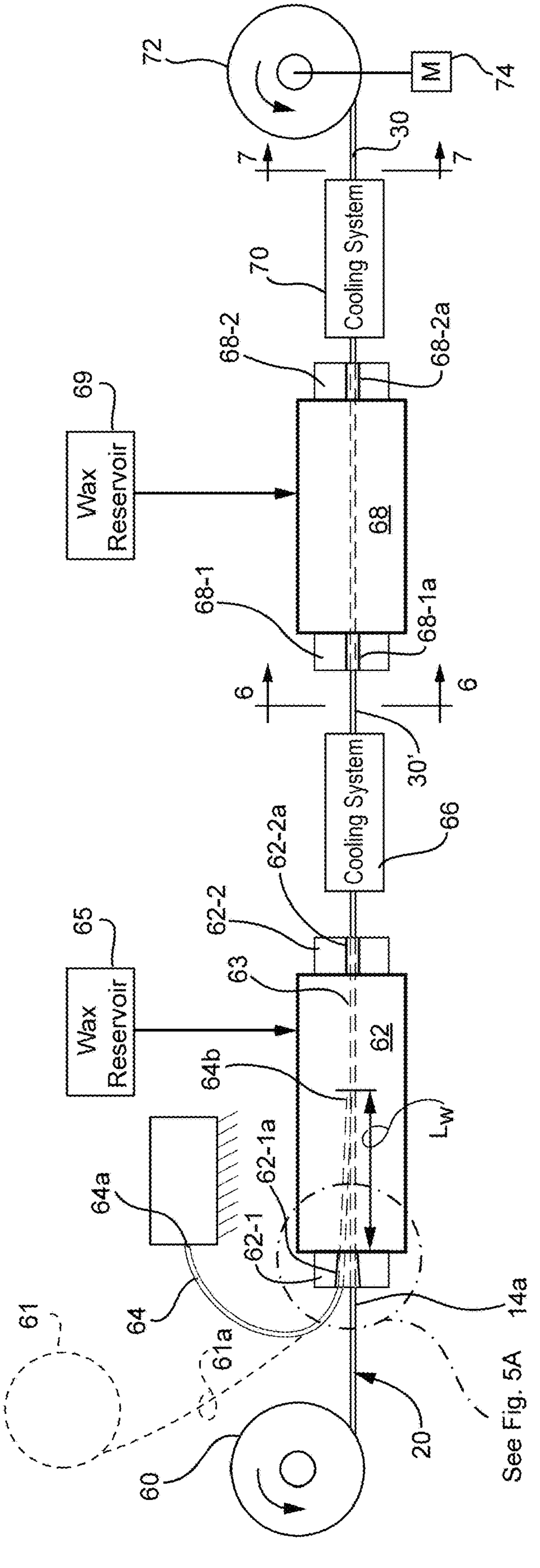
FIG. 5 is a schematic view of an apparatus by which the multiple candle wick construction shown in FIGS. 3 and 4 may be manufactured.
Figure 6:
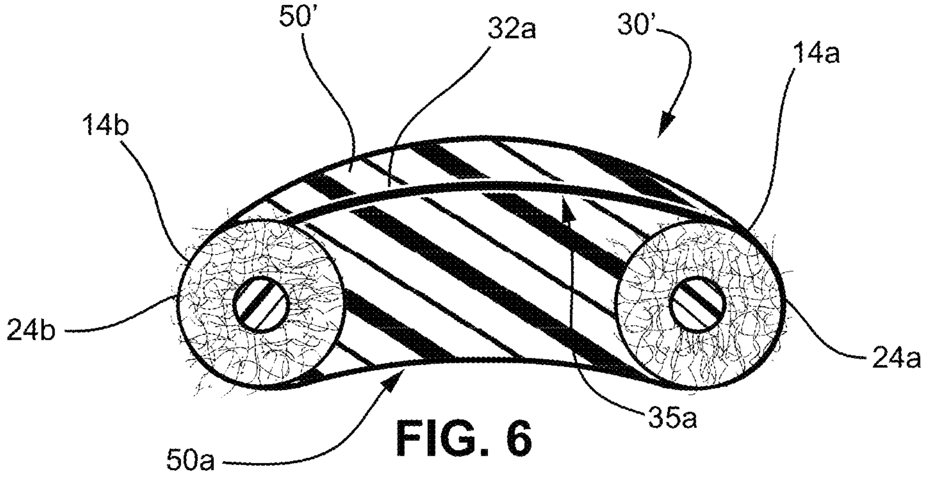
Figure 7:
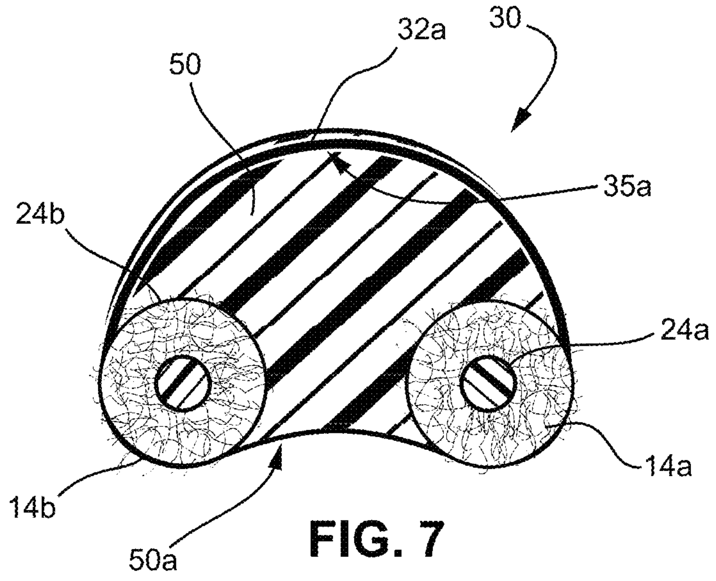

FIGS. 6 and 7 are schematic cross-sectional views of the multiple candle wick construction taken along lines 6-6 and 7-7 in FIG. 5, respectively; and FIGS. 8A-8D depict alternative structural embodiments for a forming device that may be employed in the apparatus of FIG. 5 so as to assist in folding the candle wick construction about its longitudinal axis.

DETAILED DESCRIPTION

A. Definitions

As used herein and in the accompanying claims, the terms below are intended to have the following definitions:

- "Filament" means a fibrous strand of extreme or indefinite length.
- "Fiber" means a fibrous strand of definite length, such as a staple fiber.
- "Yarn" means a collection of numerous filaments or fibers which may or may not be textured, spun, twisted or laid together.
- "Knit" or "knitted" refers to the forming of loops of yarn with the aid of thin, pointed needles or shafts. As new loops are formed, they are drawn through those previously shaped. This inter-looping and the continued formation of new loops produces a knit material.
- "Braid" or "braided" refers to a relatively narrow textile band or cord formed by plaiting or intertwining three or more strands of yarn diagonally relative to the production axis of the band or cord so as to create a regular diagonal pattern down its length.
- "Woven" means a fabric structure formed by weaving or interlacing warp-wise and weft-wise yarns or filaments of indefinite length at substantially right angles to one another.
- "Warp-wise" and "weft-wise" denote the general orientations of yarns as being generally in the machine direction and cross-machine direction, respectively.
- "Laid-in yarn" refers to the yarn or yarns that are laid-in with the warp yarns and do not form part of the fabric, e.g., do not form interlocking loops such that the warp yarns are knit around such laid-in yarns.
- "Wick curl" is the arc from the top of the wax pool to the terminal end of the wick that is formed by the wick after it is burned in the candle, expressed in degrees. Preferably, the wicks as disclosed herein exhibit a wick curl having no more than about 90° (i.e., so that the terminal end of the wick does not extend substantially beyond a horizontal plane relative to a vertical axis of the candle in which the wick is formed).
- "Self-trimming" is the regulation of the wick height and length, to an acceptable size so that it burns clean with little carbon build-up or smoking, by the candle burning process. A certain amount of "wick curl" is required for a wick to be "self-trimming".
- "Self-supporting" refers to a property of a wick whereby a finite length of the wick remains generally oriented along the wick's elongate axis when held upright without lateral support.
- "Stable wax pool" means a wax pool that has attained a maximum diameter which does not increase over time during candle burning.
- "Uniform diameter wax pool" refers to a wax pool that has a substantially uniform circular diameter.
- "Burn rate" is the amount of wax fuel, expressed by weight, consumed over a period of time, e.g. grams of wax fuel per hour (gm/hr).
- "Flexural stiffness" or "bending stiffness" is the property of an elongate yarn or filament to bend under applied force with sufficient memory to return to its original elongate state. Yarns and fibers having relatively high flexural or bending stiffness will also typically possess a relatively high Young's modulus. Those fiber elements which require a relatively high flexural or bending stiffness will thus typically possess a Young's modulus of between about 0.5 to about 10 MPa, e.g., between about 0.5 to about 5.0 MPa or between about 1.0 to about 3.0 MPa.
- "Multiple" means at least two, e.g., two, three, four or more.

B. Description of Preferred Exemplary Embodiments

Figure 1:
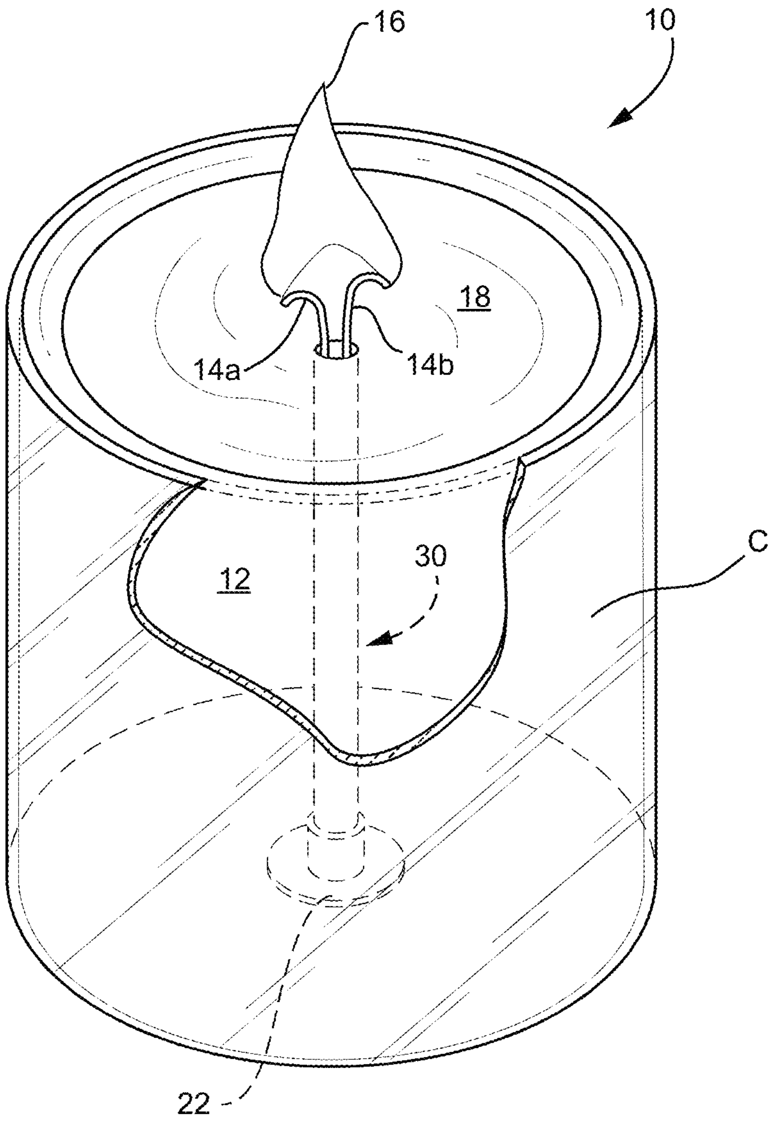
FIG. 1 is a perspective schematic view of a burning candle which embodies a multiple (dual) candle wick assembly in accordance with an embodiment of the invention.

Accompanying FIG. 1 depicts an exemplary burning candle 10 which includes a body 12 formed of a solid, combustible candle wax material provided in a container C formed of any suitable material, e.g., glass, metal, ceramic or the like. The candle wax material forming the body 12 of the candle 10 is provided with dual (two) wicks 14*a*, 14*b* in accordance with an embodiment of the present invention embedded therein. The flame 16 burning at the top end of the candle body 12 creates a generally circularly shaped (as viewed from above) molten wax pool 18 which serves as a reservoir of fuel to be supplied by the wick 14 to allow combustion to continue.

As is shown in FIG. 1, each of the wicks 14*a*, 14*b* exhibits a wick curl that is opposite to one another. That is, each of the terminal end portions of the wicks 14*a*, 14*b* is arced laterally relative to the wick's elongate axis $A_1$ so that a portion thereof extends generally at a right angle (e.g., about 90°) relative to the elongate axis $A_1$ (see FIG. 2).

As a result, the terminal ends of the wicks 14*a*, 14*b* are generally positioned at the edge of the flame 16 thereby allowing the terminal end portion of the wicks 14*a*, 14*b* to themselves to be combusted. As can be appreciated, and as was discussed above, such controlled wick curl and wick combustion allows the wicks 14*a*, 14*b* to be self-trimming.

The wicks 14*a*, 14*b* are provided as part of a self-supporting wick assembly 30 which may be embedded in the wax body 12 of the candle 10. One advantage of the wick assembly 30 containing multiple wicks 14*a*, 14*b* is that it may be inserted into a conventional metal anchor tab 22 that is used by numerous manufacturers to anchor a single wick into the wax body of the candle.

Figure 2:
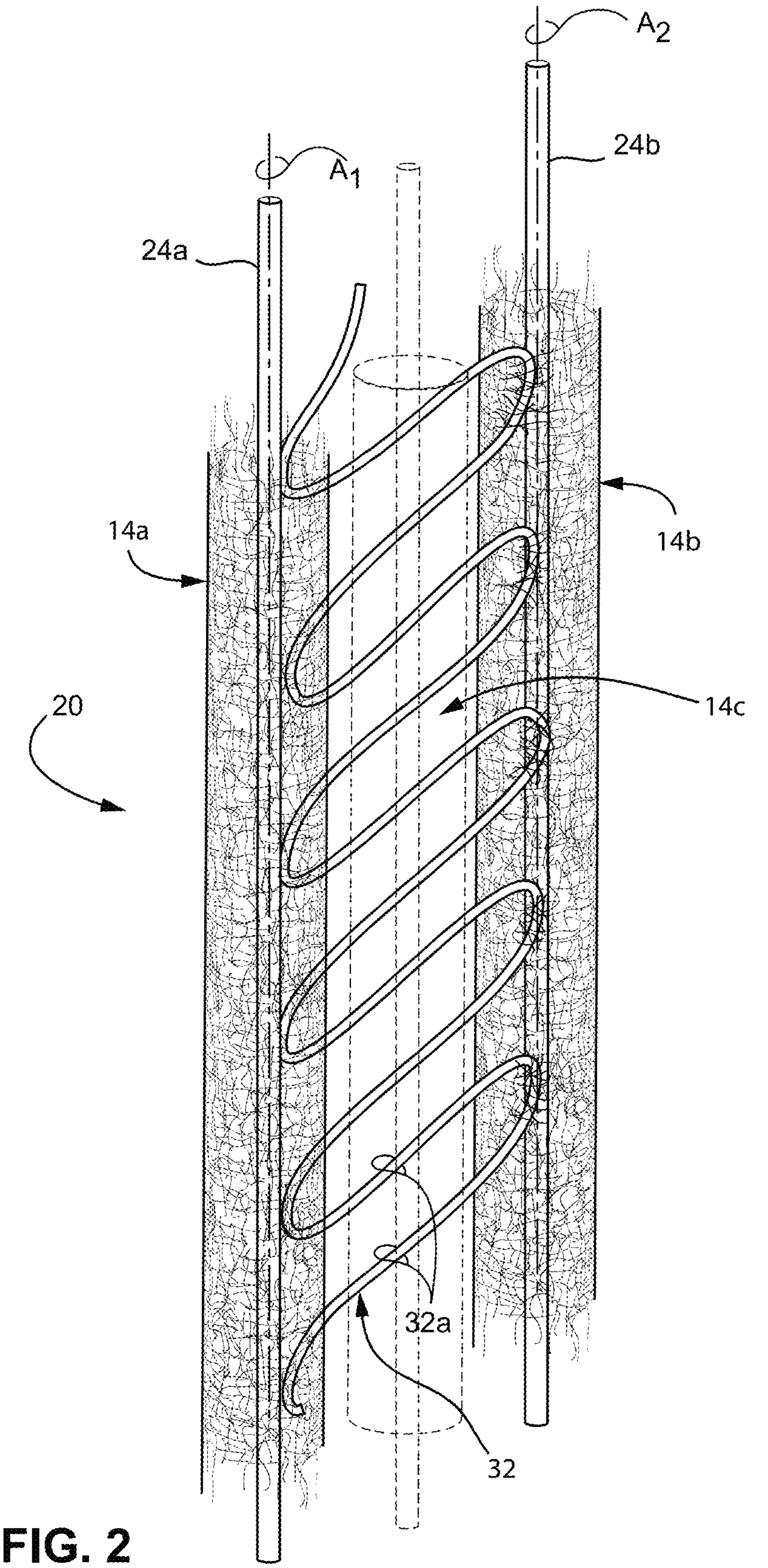
FIG. 2 is an enlarged cross-sectional elevational view of the multiple candle wick assembly that is employed in the candle depicted in FIG. 1.

As shown more specifically in FIG. 2, a multiple wick construction 20 includes individual wicks 14*a*, 14*b* that are cross-connected to one another by a ladder filament 32. In order to enhance the self-supporting characteristic of the individual wicks 14*a*, 14*b*, a stiffener filament 24*a*, 24*b* may be provided as part of the wick structure. More than two wicks 14*a*, 14*b* may be provided, e.g., a third (or more) wick 14*c* as shown in FIG. 2 could also be provided in accordance with the embodiments disclosed herein.

Each of the wicks 14*a*, 14*b* (or 14*c*) may be in the form of conventional braided, knit or woven fibrous yarns formed of conventional wick fibers, e.g., cotton, rayon, bamboo, linen, hemp and/or other cellulosic fibers. In one embodiment, the wicks 14*a*, 14*b* may be knit as described more fully in U.S. Pat. No. 6,699,034, the entire content of which is expressly incorporated hereinto by reference. Braided wicks that may be employed in the practice of this invention are also well known in the art as evidenced by U.S. Pat. Nos. 1,496,837, 1,671,267, and 5,124,200, the entire contents of each being expressly incorporated hereinto by reference.

If the wicks 14*a*, 14*b* are braided, then the ladder filament 32 may be stitched to each which 14*a*, 14*b* in a zig-zag manner so as to join the wicks 14*a*, 14*b* together in a parallel spaced-apart manner with the ladder filament 32 extending therebetween as shown in FIG. 2. Alternatively, if the wicks 14*a*, 14*b* are in the form of a knit or woven fibrous structure, then the ladder filament 32 may be laid-in as part of the knitting or weaving process to form the dual wick construction 20 depicted in FIG. 2. In certain preferred embodiments, the ladder filament 32 is laid-in during a warp knit weft insertion process whereby the individual wicks 14*a*, 14*b* are knit in a warp-wise direction and the ladder filament 32 is laid in the knit wicks in weft-wise direction. In all cases, the individual crossing portions 32*a* of the ladder filament 32 will preferably be substantially orthogonal (90°+/−) relative to the longitudinal axes A1, A2 of the wicks 14*a*, 14*b*.

As noted previously, the wicks 14*a*, 14*b* are formed of a conventional candle wick material, e.g., yarns comprised of cotton, rayon, linen, hemp, bamboo and/or other cellulosic fibers. The stiffener elements 24*a*, 24*b*, on the other hand may be a monofilament or spun yarn formed of any suitable synthetic or natural fibrous material provided it imparts the requisite stiffening properties to the wicks 14*a*, 14*b* so the wicks will substantially not bend under gravitational force (e.g., a sufficient stiffness whereby a length of each wick 14*a*, 14*b* of about 6 inches or less will remain substantially horizontal when held in a horizontal plane at an end thereof). Thus, stiffener elements 24*a*, 25*b* having a flexural stiffness (Young's modulus) of between about 0.5 to about 10 MPa can satisfactorily be employed in the practice of the embodiments of this invention.

One suitable class of materials from which the stiffener elements 24*a*, 24*b* may be made include thermoplastics, e.g., polyolefins such as polypropylene or polyethylene, nylons, polyesters and the like. In some embodiments, the stiffener elements 24*a*, 24*b* are monofilaments of polypropylene as such a material provides the desired stiffness in order to promote self-supporting capabilities to the wicks 14*a*, 14*b* so as to be capable of extending upright along the axes A1, A2, respectively, without the aid of external support. In addition, the monofilaments forming the stiffener elements 24*a*, 24*b* will exhibit a required melting temperature of greater than the melt temperature of the wax body 12, e.g., greater than about 220° F. (105° C.). One preferred form of wick stiffener elements 24*a*, 24*b* can therefore be polypropylene monofilaments having a diameter from about 0.001 inch to about 0.05 inch, for example about 0.003 inch to about 0.01 inch.

The stiffener elements 24*a*, 24*b* may also be formed of a multifilamentary yarn of spun natural fibers, such as cotton or rayon, provided with a coating material to impart stiffness to the yarn. Suitable thermoplastic coating materials such as polyolefins, nylons, polyesters, polyurethanes and the like may be employed for the purpose of imparting stiffness to the natural fibers of the multifilamentary yarn so that the elements 24*a*, 24*b* will exhibit the desired flexural stiffness as discussed previously. A finished multifilamentary yarn of spun natural fibers coated with a suitable thermoplastic coating material can be between about 750 denier to about 5000 denier, for example between about 1200 denier to about 3600 denier.

Figure 3:
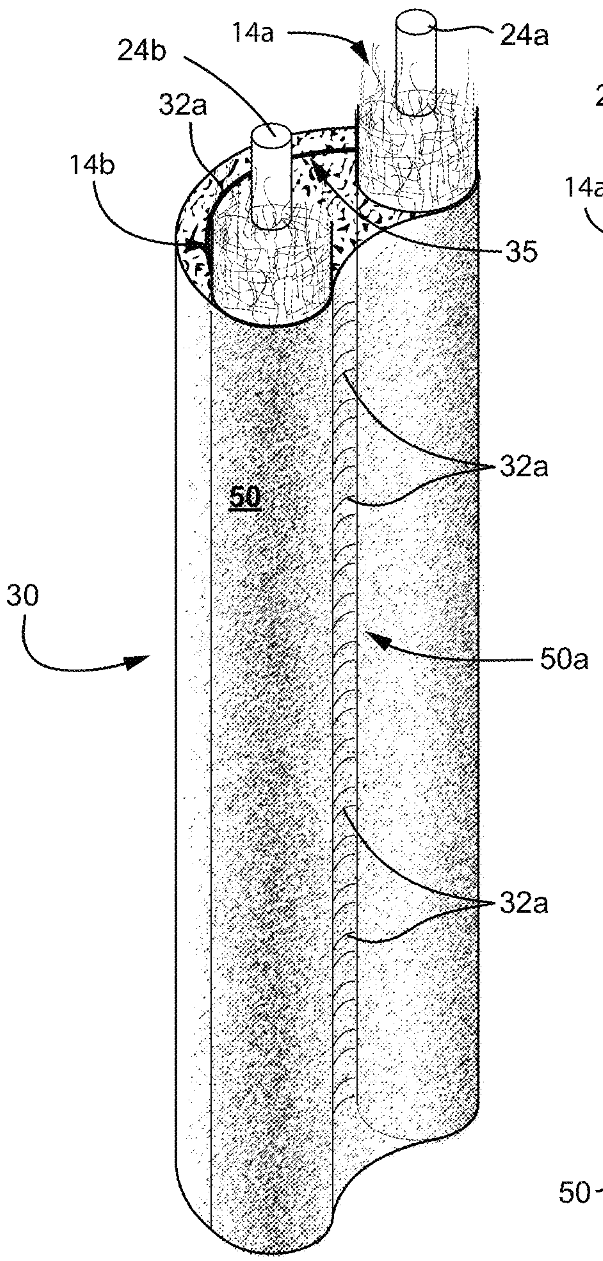
FIGS. 3 and 4 are front and rear enlarged schematic perspective views of a multiple (dual) candle wick construction in accordance with an embodiment of this invention.
Figure 4:
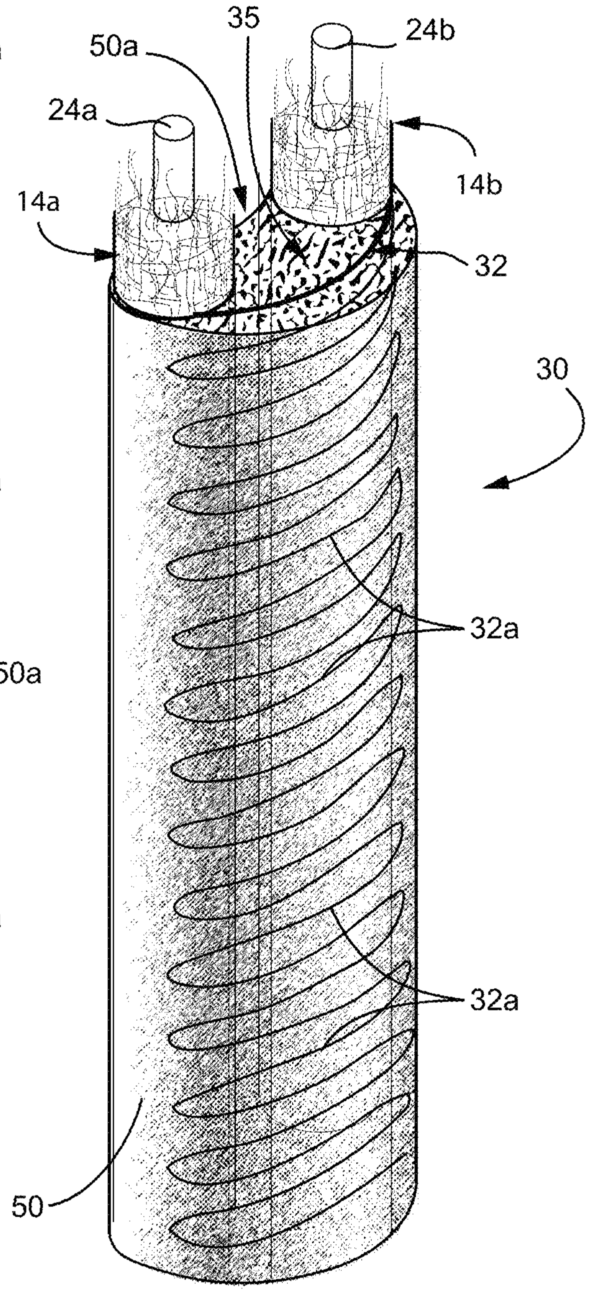

A wick assembly 30 which includes the wick construction 20 is shown in FIGS. 3 and 4. Important to the embodiments disclosed herein, the wick construction 20 is folded about its central longitudinal axis $A_L$ such that the crossing portions 32*a* form a curved (generally U-shaped) configuration thereby establishing a generally concave central region 35 between the adjacent wicks 14*a*, 14*b* along the lengthwise extent of the wick assembly 30. It will be observed that the distance between the adjacent wicks 14*a*, 14*b* while in such curved configuration is less as compared to the distance between the adjacent wicks 14*a*, 14*b* when the crossing portions 32*a* of the ladder filament 32 are oriented in a substantially axially straight (non-curved or flat) configuration (e.g., as shown in FIG. 2). The distance between the adjacent wicks 14*a*, 14*b* can vary depending on a number of factors, e.g., the nominal size of the wick assembly 30 that may be desired for end use applications and/or candle manufacturing apparatus. It is preferred however that the wicks 14*a*, 14*b* not be in physical contact with one another when the wick construction 20 is in a folded configuration.

The wick construction 20 is maintained in the folded or curved configuration (i.e., such that the adjacent wicks 14*a*, 14*b* are closer to one another as compared to the non-curved configuration) by a wax sheath 50. In the embodiments depicted, the wax sheath 50 will likewise assume a generally U-shaped cross-sectional shape having a concavity corresponding to the generally concave central region 35 of the crossing portions 32*a* of the ladder filament and an opposite convexity which coats the curved crossing portions 32*a*.

The ladder filament 32 preferably possesses sufficient flexural stiffness in order be sufficiently resilient and exert a spring bias force to spread the wicks 14*a*, 14*b* when the wick construction 20 is folded into a U-shaped configuration as discussed above. The ladder filament 32 may thus be similar to the stiffener elements 24*a*, 24*b* and thus may be formed of a thermoplastic polymer, e.g., polyolefins, such as polypropylene, nylons, polyesters and the like or thermoplastic coated multifilamentary yarns of spun natural fibers. In one embodiment, the ladder filament is a polypropylene monofilament having a diameter of between about 0.004 inch to about 0.015 inch, e.g., about 0.008 inch. Alternatively, the ladder filament 32 may be a spun yarn, in which case the ladder filament will not necessarily possess inherent resiliency. A spun yarn may therefore be employed in those instances where wick spreading is not a desired feature of the candle.

All of the thermoplastic components of the wick assembly 30, e.g., the stiffener elements 24*a*, 24*b* and the ladder filament 32 will be consumed by the flame 16 thereby allowing the wicks 14*a*, 14*b* to curl outwardly as described above. Thus, all thermoplastic elements near the flame 16 will be consumed to thereby leave only the wicks 14*a*, 14*b* in contact with the liquid wax pool 18.

A schematic diagram of a continuous manufacturing apparatus and process to form the multiple wick assembly 30 is depicted in accompanying FIG. 5. As shown, the process initially involves supplying a continuous ribbon of the wick construction 20 from a spool 60. When supplied from the spool 60, the wick construction 20 will be in an essentially flat condition, i.e., the wicks 14*a*, 14*b* and the crossing portions 32*a* of the ladder filament 32 will each be positioned within a common horizontal plane extending out of the plane of FIG. 5. Only the wick 14*a* is therefore depicted in FIG. 5.

Figure 5A:
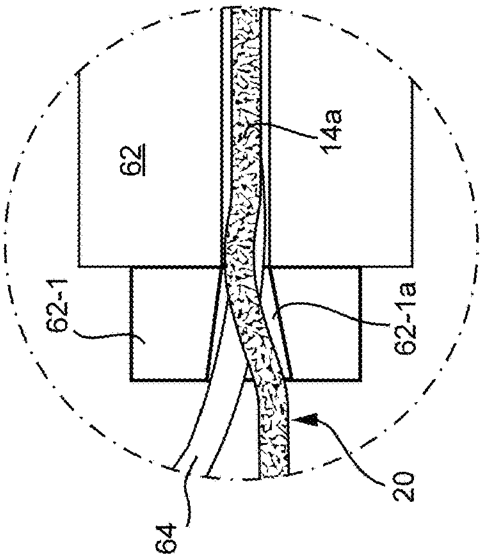
FIG. 5A is an enlarged view of the inlet die associated with the first wax applicator depicted in FIG. 5.

As is perhaps better shown in the enlargement of FIG. 5A, the substantially flat ribbon of the wick construction 20 will be fed through an inlet forming die 62-1 associated with a first wax application 62. According to the embodiment depicted, a forming wire 64 is provided which curvilinearly extends from a fixed end 64*a* to a free terminal end 64*b* located a predetermined distance $L_w$ within the cylindrical wax application channel 63 of the wax applicator 62. As is perhaps better shown by the enlarged view of FIG. 5A, the forming wire 64 is substantially coaxially disposed within the die orifice 62-1*a* of the inlet forming die 62-1 and is positioned between the wicks 14*a*, 14*b* (it being understood that only wick 14*a* is visible in FIG. 5*a*).

The forming orifice 62-1*a* of the inlet forming die 62-1 is sized and configured such that movement of the wick construction 20 in the direction of arrow A will cause the wick construction 20 to be coaxially folded about the forming wire 64 thereby assuming a generally U-shaped configuration whereby the wicks 14*a*, 14*b* are brought physically closer together while the crossing portions 32*a* of the ladder filament are convexly bowed. Since a length of the forming wire 64 extends for into the cylindrical wax application chamber 63, the wick construction 20 will be maintained in such a U-shaped configuration while wax is being applied therewithin from the wax reservoir 65. Excess wax supplied to the first wax applicator 62 may be returned to the wax reservoir and/or directed to a collection site (not shown) for later reuse or waste disposal.

The now initially waxed wick assembly (designated as an intermediate wax-sheathed wick assembly 30' in FIG. 6) is pulled through an outlet die orifice 62-2*a* associated with an outlet die 62-2 and a downstream cooling system 66 (e.g., a liquid (water) cooling bath and/or spray system and/or a forced air cooling system). It will be understood that the first wax applicator 62 serves to provide an initial wax sheath 50' so as to maintain the intermediate wick assembly 30' in a generally U-shaped configuration.

The intermediate wick assembly 30' continues to be conveyed sequentially through a further downstream inlet forming die 68-1, a second wax applicator 68 and an outlet forming die 68-2. The forming die 68-1 will include a forming orifice 68-1*a* which is sized and configured to further fold the intermediate wick assembly 30' into a more pronounced U-shaped configuration (i.e., whereby the wicks 14*a*, 14*b* are separated by a lesser dimension) so that additional wax can be supplied thereto from a wax reservoir 69. Upon being further conveyed through the forming orifice 68-2*a* of the outlet forming die 68-2 and cooled within the second cooling system 70 (e.g., a liquid (water) cooling bath and/or spray system and/or a forced air cooling system), the final wax sheath 50 is provided and the wick assembly 30 assumes its final U-shaped configuration as shown in FIG. 7 (see also FIGS. 3 and 4). Here again, any excess wax provided to the wax applicator 68 may be returned to the wax reservoir 69 and/or directed to a collection site for reuse or waste disposal. The final wick assembly 30 discharged from the cooling system may be taken up on a product spool 72 for shipment and further processing as a component part of candles.

As is shown in FIG. 5, the product spool 72 may be mounted on an axle driven by a drive motor 74 to cause the ribbon of the wick construction 20 and then subsequently the intermediate wick assembly and final wick assembly 30 to be conveyed through the various unit operations in the direction of conveyance arrow $A_C$. Those in this art may however contrive other means for conveyance through the unit operations needed to form the wick assembly 30.

The process and apparatus shown in FIG. 5 may be modified in various ways. For example, the described process may be discontinuous such that the intermediate wick assembly 30' is taken upon on an intermediate spool. The wick assembly 30' on such a take-up spool may then be transported to a final assembly location whereby the wick assembly 30 is formed by providing the final wax coating 50 onto the intermediate wick assembly 30'.

Alternatively or additionally, as noted briefly above, the apparatus previously discussed may be provided with various types of forming devices. While a stationary (fixed position) forming wire 64 as described above can satisfactorily be employed in the formation of the candle wick assembly 30, other configurations of forming devices may be envisioned by those skilled in this art. For example, as shown in FIG. 5, the forming device may be embodied in a wax filament 61*a* of suitable diameter which may be supplied via a supply roll 61 upstream of the forming die 62-1 and continuously conveyed together with the ribbon of the candle wick construction 20 through the wax applicator 63. The wax filament 61*a* may therefore be formed of substantially the same wax material as the wax material applied by the wax applicator 63. The wax filament 61*a* may thus initially provide a structural mandrel to assist in formation of the wax construction 20 in a U-shaped configuration but will thereafter melt within the wax applicator 63 upon application of additional wax material so as to integrally meld with such additional wax material and form the sheath 50.

Figure 8A:
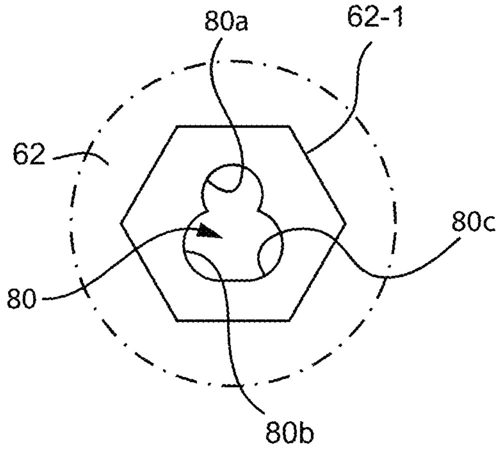
Figure 8B:
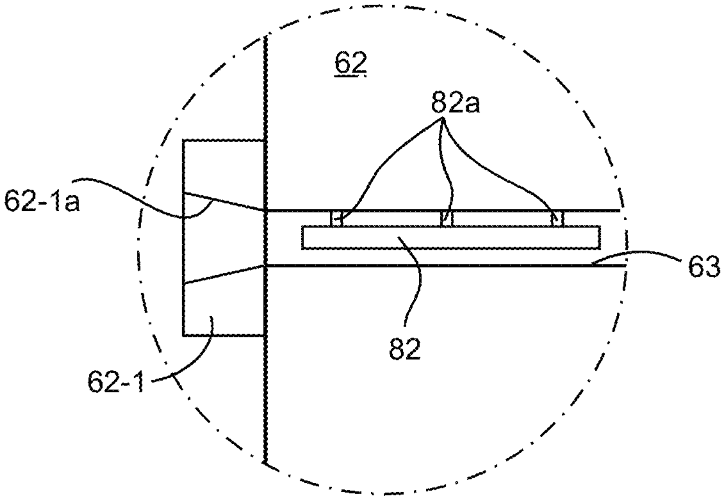
Figure 8C:
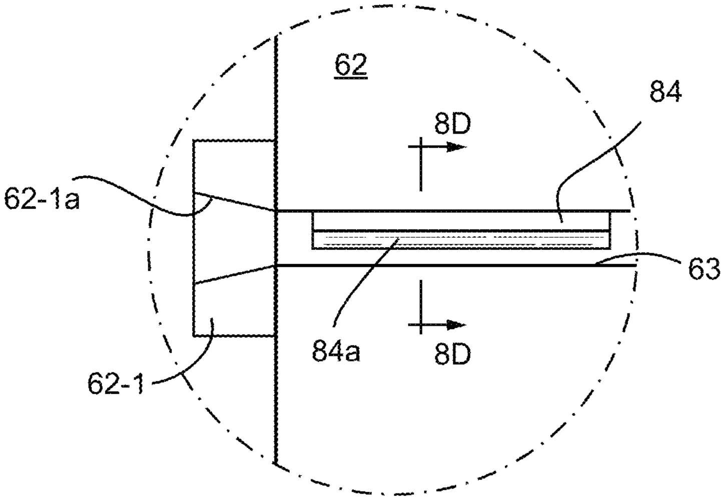
Figure 8D:
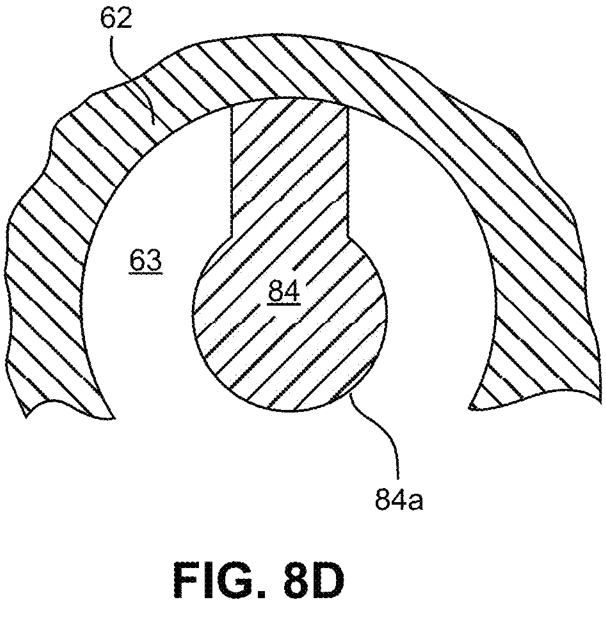

As shown in FIG. 8A, the forming device may be embodied in a multilobal forming orifice 80 provided as an integral part of the inlet die 62-1 to the wax applicator 62. An upper lobe 80*a* of the forming orifice 80 can be provided so as to accommodate either the fixed position forming wire 64 or the continuously supplied wax forming filament 61*a* as described previously while an opposed pair of forming lobes 80*b*, 80*c* will assist in folding the wick construction 20 into its U-shaped configuration. Fixed-position forming mandrels may also be provided such as a fixed position forming rod 82 supported within the wax applicator channel 63 by supports 82*a* as depicted by FIG. 8B or a forming plate 84 having a lengthwise extending convex forming bead 84*a* along an edge thereof as depicted in FIGS. 8C and 8D.

It will also be appreciated that the forming device(s) and the ribbon of the candle wick construction 20 may be introduced into the wax applicator channel in other orientations as compared to that depicted in the accompanying Figures. For example, the forming device(s) and the ribbon of the candle wick construction 20 may be reversed as compared to that depicted so that the candle wick assembly 30 assumes an upside down U-shaped configuration, e.g., the candle wick construction 20 is positioned above the forming wire 65 or other forming device(s) that may be provided as viewed in the Figures.

Other changes and modifications can be envisioned. In this regard, the assembly shown in FIG. 1 is depicted as being part of a so-called plug candle whereby the wick assembly 30 is inserted into a pre-formed hole in the solid wax body 12. In such a case, therefore, the wick assembly 30 will retain its structural characteristics along the lengthwise extent thereof but will allow the wicks 14*a*, 14*b* to separate as described previously at the upper terminal end when lit.

Alternatively, the wick assembly 30 may be provided as a self-supporting structure in a poured candle manufacturing process, i.e., a process whereby molten wax fuel is poured into a mold in which the wick assembly 30 is positioned. Contact between the molten wax and the wax sheath 50 will thus cause the latter to melt and become a physical part of the wax fuel which in turn allows the wicks 14*a*, 14*b* to separate in the molten wax, e.g., by virtue of the resilient spring force provided by the cross-connected ladder filament 32. The stiffener elements 24*a*, 24*b* will thus retain the self-supporting characteristics of the individual wicks 14*a*, 14*b* during such separation and will therefore retain the wicks 24*a*, 24*b* in an upright manner until the molten wax solidifies. A terminal end portion of the wick assembly 30 that was not contacted by the molten wax during the pouring operation will thus extend upwardly from the candle body and present itself as a single wick element. Upon being lit, however, the wax sheath 50 will melt along with the other thermoplastic filament components to allow the wicks 14*a*, 14*b* to spread apart and thereby function as previously described.

Various modifications within the skill of those in the art may therefore be envisioned and implemented without departing from the spirit and scope of the invention described herein. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A method of making a candle wick assembly comprising the steps of:

(a) providing a multiple candle wick construction which comprises:

(i) at least first and second spaced-apart candle wicks, and (ii) a ladder filament connected to and extending back and forth between the first and second candle wicks;

(b) forming the multiple candle wick construction into a generally U-shaped configuration; and (c) applying a wax sheath around the multiple candle wick construction so as to maintain the generally U-shaped configuration thereof.

2. The method according to claim 1, wherein step (c) comprises providing a wax applicator having an applicator channel sized and configured to receive the multiple candle wick construction therein.

3. The method according to claim 2, wherein step (c) comprises:

(c1) introducing the candle wick construction into an inlet of the wax applicator channel relative to a forming device to cause the crossing portions of the ladder filament to be folded about a longitudinal axis of the candle wick assembly and into a generally U-shaped configuration; and then subsequently (c2) conveying the generally U-shaped candle wick construction through the applicator channel and applying a wax sheath therein onto the candle wicks and crossing portions of the ladder filament to thereby maintain the candle wick construction in the U-shaped configuration thereof so as to obtain the candle wick assembly.

4. The method according to claim 1, wherein step (b) is practiced by conveying the candle wick assembly relative to a longitudinally oriented fixed-position forming mandrel to cause the candle wick assembly to be folded about the forming mandrel and assume the generally U-shaped configuration.

5. The method according to claim 4, wherein the fixed-position forming mandrel is a fixed-position wire, rod or plate positioned at least partly within the wax applicator channel.

6. The method according to claim 1, wherein step (b) is practiced by conveying the candle wick construction through a forming die positioned at the inlet of the wax applicator channel to cause the candle wick construction to be folded about the longitudinal axis thereof into the generally U-shaped configuration.

7. The method according to claim 3, wherein step (c) is practiced by introducing a wax filament into the inlet of the wax applicator channel simultaneously with the candle wick construction and causing the candle wick construction to be folded about the wax filament into the generally U-shaped configuration thereof.

8. The method according to claim 3, wherein step (b) comprises providing a stationary forming wire having a positionally fixed proximal end and extending the forming wire from the proximal end thereof through the inlet of the wax applicator channel such that a free distal end of the forming wire terminates a predetermined distance within the applicator channel.

9. The method according to claim 3, wherein step (b) is practiced by introducing the candle wick construction into the inlet of the wax applicator channel in a substantially flat configuration upstream of the forming device.

10. The method according to claim 1, wherein step (c) is practiced by conveying the candle wick assembly through a cooling system to cool and solidify the applied wax sheath.

11. The method according to claim 10, which further comprises winding the candle wick assembly onto a spool.

12. A method of forming a candle which comprises:

(a) providing a generally U-shaped multiple candle wick assembly which comprises:

(i) at least first and second spaced-apart candle wicks; and (ii) a ladder filament connected to and extending back and forth between the first and second candle wicks; and (iii) a wax sheath covering the multiple candle wick construction; and (b) introducing the candle wick assembly into a solid candle wax body to thereby form the candle.

13. The method according to claim 12, wherein step (b) comprises:

(i) forming a hole in the solid candle wax body, and (ii) inserting the candle wick assembly into the hole such that a terminal end of the candle wick assembly extends above the solid candle wax body.

14. The method according to claim 13, which further comprises providing an anchor tab on a bottom end of the candle wick assembly.

15. The method according to claim 12, wherein step (b) comprises the steps of:

(i) positioning the candle wick assembly within a container, (ii) pouring molten candle wax into the container so as to surround a length of the candle wick assembly positioned therein; and (iii) allowing the candle wax to solidify and form the solid candle wax body.

16. The method according to claim 15, which further comprises providing an anchor tab on a bottom end of the candle wick assembly.

* * * * *